US005866046A

United States Patent [19]

Tozawa

[11] Patent Number: 5,866,046

[45] Date of Patent: Feb. 2, 1999

[54] METHOD FOR MANUFACTURING ULTRA-FINE WATER DROPLETS AND DEVICE FOR MANUFACTURING THE SAME

[75] Inventor: Shigeru Tozawa, Tokyo, Japan

[73] Assignee: Cosmo EC Co., Ltd., Tokyo, Japan

[21] Appl. No.: 893,617

[22] Filed: Jul. 11, 1997

[30] Foreign Application Priority Data

Jul. 25, 1996 [JP] Japan .................................... 8-213258

[51] Int. Cl.[6] .................................................. B01F 3/04

[52] U.S. Cl. .......................... 261/78.2; 261/115; 95/213; 95/219; 96/297; 96/319; 96/321

[58] Field of Search ............................. 55/233, 235, 237, 55/238; 95/213, 219; 261/78.2, 115; 96/296, 297, 314, 319, 321, 123, 125, 127, 128

[56] References Cited

U.S. PATENT DOCUMENTS

| | | | |
|---|---|---|---|
| 873,924 | 12/1907 | Cramer | 261/115 |
| 1,264,263 | 4/1918 | Brassert | 261/115 |
| 2,259,031 | 10/1941 | Fisher | 55/238 |
| 2,496,281 | 2/1950 | Fisher | 55/238 |
| 2,732,909 | 1/1956 | Campbell | 55/237 |
| 3,050,919 | 8/1962 | Tailor | 95/213 |
| 3,323,290 | 6/1967 | Stern | 95/219 |
| 3,412,529 | 11/1968 | Tailor | 95/213 |
| 3,566,582 | 3/1971 | Yankura | 95/219 |

FOREIGN PATENT DOCUMENTS

| | | | |
|---|---|---|---|
| 57-55117 | 11/1982 | Japan . | |
| 1087161 A | 4/1984 | U.S.S.R. | 95/219 |
| 1579541 A | 7/1990 | U.S.S.R. | 261/78.2 |

*Primary Examiner*—C. Scott Bushey
*Attorney, Agent, or Firm*—Browdy and Neimark

[57] ABSTRACT

This invention relates to a method for manufacturing ultra-fine water droplets containing a large amount of anions and in the present invention, there is provided a permeating cylindrical striking plate for manufacturing ultra-fine water droplets at an intermediate position between the cylindrical main body and the water atomizing and injecting pipe, wherein the pressurized water is atomized and injected from the water atomizing and injecting pipe toward the striking plate, the obtained ultra-fine water droplets are fed out of the permeating holes at the striking plate and fed out of the main body by the air moving in the main body.

5 Claims, 2 Drawing Sheets

METHOD FOR MANUFACTURING ULTRA-FINE WATER DROPLETS AND DEVICE FOR MANUFACTURING THE SAME

DETAILED DESCRIPTION OF THE INVENTION

Art Field of the Invention

This invention relates to a method and a device for manufacturing ultra-fine water droplets which are substantially helpful for purifying an indoor area or improving health due to the fact that a large amount of ultra-fine water droplets having a size of 0.5μ or less and in particular anion changed ultra-fine water droplets having a size of 0.001μ or less can be manufactured and supplied.

Problems to be Solved by the Invention

In general, feeding air containing ultra-fine water droplets into an indoor area, catching indoor ultra-fine dusts, circulate them so as to purify the indoor area or supplying ultra-fine water droplets containing anion into lungs of a patient and to improve health are known.

In the prior art, in order to manufacture the ultra-fine water droplets, pressurized water was atomized toward a wall, water droplets were broken by striking action and the manufactured ultra-fine water droplets were fed into an indoor area through an air blowing operation (refer to Japanese Patent Publication No. Sho 57-55117).

However, even if water droplets were atomized against a smooth wall, the water droplets were merely broken and dispersed, and a large amount of ultra-fine water droplets could not be manufactured.

If the ultra-fine water droplets can be manufactured effectively, an amount of water droplets per volume can be remarkably increased, wherein a large amount of anions are contained in the water droplets, resulting in remarkably improved effects.

In the present invention, it is an object of the present invention to manufacture the ultra-fine water droplets more effectively.

Means for Solving the Problem

In the present invention, a mass production of ultra-fine water droplets is enabled by arranging a permeating cylindrical striking plate for manufacturing ultra-fine water droplets at an intermediate part between a cylindrical main body and a water injection pipe arranged at a central part of the main body.

The present invention is characterized in that there is provided the permeating cylindrical striking plate for manufacturing ultra-fine water droplets.

This striking plate has many permeating holes at its plate surface and is provided with, at its plate surface, either spot-like or line-like water droplets breaking on acute-angled edges directed toward its center.

As this striking plate, any type of plate capable of effectively breaking the water droplets may be applied, although as its commercial available type plate, a honeycomb type filter can be applied, wherein a side having acute cutting edges is placed inside to form a cylinder and then the cylindrical member may be installed between the main body and the water injection pipe.

Since the position of the cylindrical striking plate is varied in reference to a size of the main body and the hydraulic pressure of the injected water, it is necessary to determine the position in advance in reference to various kinds of operations. In the case that the device is small in size, it is preferable to set a position of about ⅔ ranging from its center to the main body.

Water droplets in which pressurized water is atomized and injected from the water atomizing pipe arranged at a central part strike against the acute-angled edges and are broken into ultra-fine water droplets having a size of 0.5μ or less. The ultra-fine water droplets are drawn by air moving at a high speed from the permeating holes along the outside part of it, rotate within the main body and the air is fed out of the air feeding-out port.

This invention relates to a method for manufacturing ultra-fine water droplets characterized in that there is provided a permeating cylindrical striking plate for manufacturing ultra-fine water droplets at an intermediate position between a cylindrical main body and a water atomizing and injecting pipe arranged at a central part of the main body, pressurized water is atomized and injected from the water atomizing pipe toward the striking plate, the obtained ultra-fine water droplets are discharged out of the permeating holes in the striking plate and fed out of the main body with the air moving in the main body.

In addition, the present invention relates to a device for manufacturing ultra-fine water droplets comprising a cylindrical main body having an air feeding inlet and an air discharging outlet, a water atomizing and injecting pipe arranged at a central part of the main body and a permeating cylindrical striking plate for manufacturing ultra-fine water droplets at an intermediate position between them, and more particularly, the invention relates to a device for manufacturing ultra-fine water droplets comprising a cylindrical main body having an air feeding inlet arranged at the upper part of the main body in a tangential direction and an air discharging port arranged at a lower part of the main body in a tangential direction, a water atomizing and injecting pipe for atomizing and injecting water in all directions arranged at a central part of the main body and a cylindrical permeating striking plate for manufacturing ultra-fine water droplets at an intermediate position between them.

PREFERRED EMBODIMENT OF THE INVENTION

Figure 1:
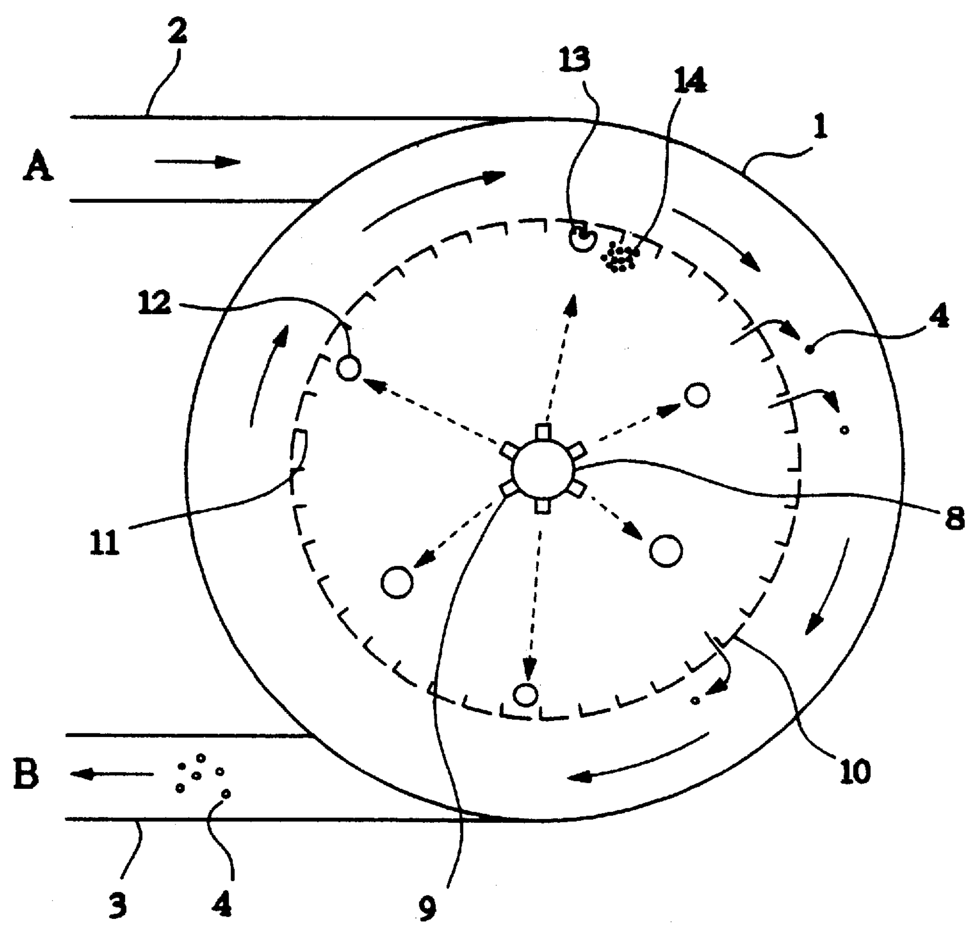
FIG. 1 is a cross-sectional illustrative view for showing a device for manufacturing ultra-fine water droplets of the present invention.

Referring now to the drawings, one preferred embodiment of the present invention will be described in detail as follows.

Figure 2:
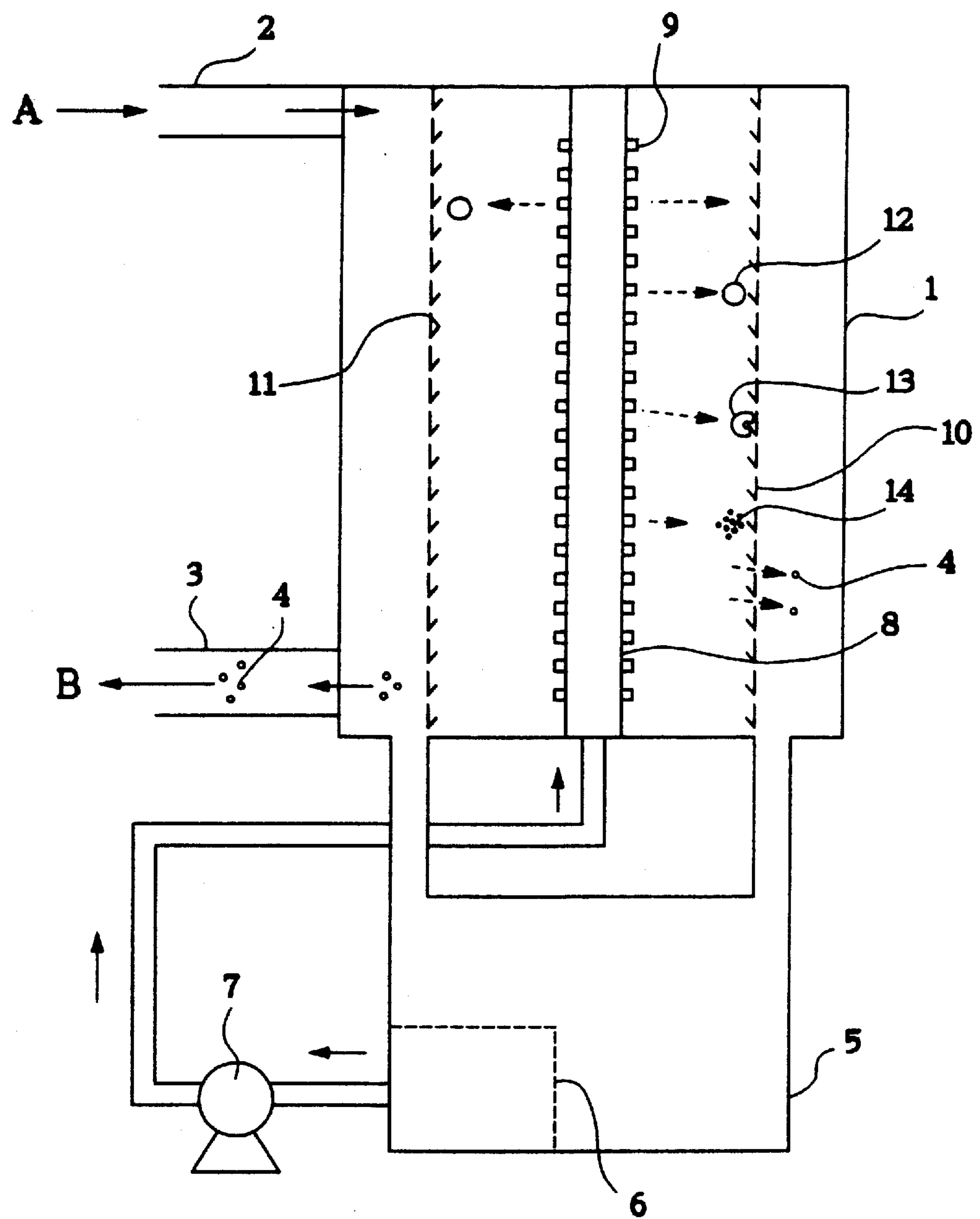
FIG. 2 is a longitudinal sectional view for illustrating a device for manufacturing ultra-fine water droplets of the present invention.

FIG. 1 is a cross-sectional illustrative view showing a device for manufacturing ultra-fine water droplets of the present invention and FIG. 2 is a longitudinal sectional view thereof.

Reference numeral 1 denotes a cylindrical main body having an air feeding inlet 2 arranged at an upper part in a tangential direction and an air feeding-out port 3 arranged at a lower part in a tangential direction, wherein air sucked by a fan from a room is circulated at an inner wall of the main body at a high speed as shown by arrow A, fine dust particles are adhered to the inner wall of the main body during this circulating operation, the air contains ultra-fine water droplets, and the air is fed out in a direction of arrow B so as to supply the ultra-fine water droplets into a room.

Reference numeral 5 denotes a water tank which is filled with recirculated water containing some fine dust washed from the inner wall of the main body 1 and water separately supplied. The water passes through a filter film 6 and is forcedly fed out by a pump 7, whereby the water is atomized and injected by the water atomization pipe 8 from many injection ports 9 in all directions.

Reference numeral 10 denotes a permeating striking plate for manufacturing ultra-fine water droplets comprised of a cylindrical honeycomb filter with the acute angled cut edges 11 being placed inside, wherein water droplets 12 injected from the injection ports 9 strike at 13 against the acute angled cut edges 11 where they are further broken at 14 into ultra-fine water droplets 4.

The obtained ultra-fine water droplets 4 are drawn with air circulated at a high speed along the inner wall of the main body, resulting in that a large amount of water is contained in the circulating air.

Air containing a large amount of ultra-fine water droplets 4 is fed out from the main body in a direction B and further fed into a room.

Effects of the Invention

In the present invention, the permeating striking plate for manufacturing ultra-fine water droplets is used to manufacture ultra-fine water droplets so as to enable the water droplets to be contained in the high speed circulating air.

What is claimed is:

1. A method for manufacturing ultra-fine water droplets using a permeating cylindrical striking plate having openings with adjacent edges directed toward a water atomizing pipe, comprising:

feeding a stream of air in at least a partially circular path along said permeating cylindrical striking plate;

injecting atomized water under pressure from said pipe into a zone adjacent said moving air and against said edges of said permeating cylindrical striking plate to break up said atomized water into ultra-fine water droplets; and passing said ultra-fine water droplets into said stream of moving air.

2. A method according to claim 1 wherein said stream of air is passed along an outside surface of said permeating cylindrical striking plate and said pressurized and atomized water is injected from said injecting pipe within said permeating cylindrical striking plate.

3. A device from manufacturing ultra-fine water droplets comprising a cylindrical main body having an annular passageway, an air feeding inlet into said annular passageway and an air discharging outlet from said annular passageway;

a water atomizing and injecting pipe at a central part of said main body, and adapted to discharge atomized water under pressure toward said annular passageway; and a permeating cylindrical striking plate disposed between said annular passageway and said water atomizing and injecting pipe, said permeating cylindrical striking plate having a plurality of openings passing therethrough with edges adjacent said openings and facing said atomizing and injecting pipe, said edges comprising means for breaking up atomized water from said atomizing and injecting pipe into ultra-fine water droplets.

4. A device according to claim 3 wherein said air feeding inlet is disposed at an upper part of said main body in a tangential direction, and said air discharging outlet is located at a lower part of said main body in a tangential direction.

5. A device according to claim 3 wherein said main body, said pipe and said striking plate are stationary with respect to one another; said main body has a vertical axis; said pipe extends vertically along said axis; and said pipe has water-ejecting openings along its vertical length and its periphery.

* * * * *